United States Patent [19]
Bratton et al.

[11] 3,875,277
[45] Apr. 1, 1975

[54] METHOD FOR MAKING POLYCRYSTALLINE ALUMINA ARC TUBES

[75] Inventors: Raymond J. Bratton, Delmont; Shih M. Ho, Pittsburgh, both of Pa.

[73] Assignee: Westinghouse Electric Corporation, Pittsburgh, Pa.

[22] Filed: July 30, 1973

[21] Appl. No.: 383,622

[52] U.S. Cl.......................... 264/65, 106/39, 106/62, 106/65, 106/73.4, 264/1, 264/56, 264/125, 264/332, 264/DIG. 25
[51] Int. Cl..... F27d 7/06, C04b 35/64, C04b 35/10
[58] Field of Search.............. 264/65, 125; 423/600; 106/62, 65, 73.4

[56] References Cited
UNITED STATES PATENTS

| | | | |
|---|---|---|---|
| 3,530,200 | 9/1970 | Ho | 264/65 |
| 3,655,330 | 4/1972 | Rettew et al. | 264/65 |

OTHER PUBLICATIONS

Smoke and Bersch, "Unique Approaches To Reduce Sintering Temperatures–Hydroogen and Vacuum Firing," Ceramic Age, April 1965, p. 103–104.

*Primary Examiner*—Donald J. Arnold
*Assistant Examiner*—John Parrish
*Attorney, Agent, or Firm*—W. D. Palmer

[57] ABSTRACT

For making tubular polycrystalline alumina arc tubes, the magnesium compound grain-growth inhibitor is added to very finely divided alumina as magnesium aluminate spinel consisting of irregular shaped particles of average diameter less than about 100 nm. The spinel and alumina are thoroughly mixed to achieve a uniform distribution, thereafter isostatically pressed to form a pressed or green tube, with the pressed tube initially being presintered and then final sintered to achieve a density which approximates theoretical.

3 Claims, 1 Drawing Figure

Add to finely divided alumina from 0.15% to 0.7% by weight of magnesium aluminate spinel consisting of irregular shaped particles of average diameter not exceeding about 100 nm, and mixing to obtain uniform distribution.

Fill powdered mixture into an isostatic pressing mold having tubular dimensions.

Isostatically press mold-contained powder at a pressure of at least 15,000 psi.

Presinter pressed tube at a temperature of at least 800°C for at least one hour.

Sinter tube at a temperature of 1700°C to 1950°C in oxygen, hydrogen or vacuum.

METHOD FOR MAKING POLYCRYSTALLINE ALUMINA ARC TUBES

CROSS-REFERENCE TO RELATED APPLICATIONS

In copending application Ser. No. 383,623, filed concurrently herewith, by William G. Carlson, titled "Method For Making Polycrystalline Alumina Tubing," and owned by the present assignee, there is disclosed a method for making polycrystalline alumina tubing wherein the finely divided alumina is incorporated as a part of a water-based slurry which is then spray dried in order to form a very free flowing agglomerated powder, which powder is further processed into an alumina arc tube. The present method can use such a spray drying technique in order to form a free flowing agglomerated powder.

BACKGROUND OF THE INVENTION

This invention relates to a method for making polycrystalline alumina arc tubes and, more particularly, to an improved method for making such arc tubes for arc discharge devices.

Polycrystalline alumina arc tubes and methods for preparing the same are described in U.S. Pat. No. 3,026,210, dated Mar. 20, 1962, to R. L. Coble. Such arc tubes have now been used commercially for high-pressure sodium-mercury discharge devices.

In fabricating such arc tubes, magnesium oxide is normally added in relatively small amounts to very finely divided alumina, prior to sintering of same, to form the arc tube body. The magnesium oxide serves as a grain growth inhibitor so that the formed body will have the desired degree of density, which approximates theoretical, and a desired relatively small grain size. When the magnesium is added as a oxide, it has been found that the amount desirably should fall within the range of from 0.1 to 0.25% by weight, taken with respect to the weight of finely divided alumina. If less than 0.1% by weight of magnesium oxide is utilized, it has been found that enough of the magnesium oxide will volatilize from the surface portions of the arc tube during sintering that the small residual amount of magnesium oxide will not inhibit grain growth adequately, resulting in excessive large grains in the polycrystalline alumina at the surface portions of the arc tube. Apparently during the sintering operation, the magnesium oxide does substantially convert to magnesium aluminate spinel, and if more than 0.25% by weight of the magnesium oxide is added to the finely divided alumina, there will be present a sufficient amount of the formed spinel to increase the light scattering properties, and thus the translucency, of the sintered arc tube, thereby impairing the performance of the discharge device which incorporates such arc tube. In addition, in the conversion of the magnesium oxide to magnesium aluminate spinel during the sintering process, there can be considerable localized segregation of the magnesium oxide, which again can have a deleterious effect upon the controlled grain growth which is desired in the arc tube processing.

In U.S. Pat. No. 3,567,472, dated Mar. 2, 1971 is disclosed an arc tube formed of magnesium aluminate spinel which has a small amount of calcium oxide dispersed therein. The very finely divided and irregular shaped spinel powder which is used in preparing this member can also be used as an additive to alumina for processing polycrystalline alumina arc tubes, in accordance with the present invention. Such reactive spinel powder is also described in Bulletin of the American Ceramic Society, Vol. 48, No. 8, pages 759–762 (1969), article by R. J. Bratton, one of the co-inventors herein.

SUMMARY OF THE INVENTION

In accordance with the present invention, a tubular polycrystalline alumina member, suitable for use as an arc tube, is prepared by adding to very finely divided, high-purity alumina powder from about 0.15 to 0.7% by weight of the alumina of magnesium aluminate spinel consisting of irregular shaped particles of average diameter less than about 100 nm and preferably less than about 50 nm. The spinel and alumina are thoroughly mixed to achieve a uniform distribution and the mixture is filled as a dried powder into an isostatic pressing mold. The mold-contained powder is isostatically pressed at a pressure of at least 15,000 psi to produce a green tube. After removal from the mold, the pressed green tube is presintered at a temperature of at least 800°C for at least one hour to provide the pressed tube with additional strength to facilitate handling. It is then final sintered at a temperature of from 1700°C to 1950°C in oxygen, hydrogen, or vacuum for a sufficient period of time to obtain a grain size in the sintered tube of at least 10 microns.

BRIEF DESCRIPTION OF THE DRAWING

For a better understanding of the invention, reference may be had to the flow diagram, exemplary of the invention, which is set forth in the sole FIGURE and illustrates the basic steps of the present process.

DESCRIPTION OF THE PREFERRED EMBODIMENT

In preparing very finely divided magnesium aluminate spinel particles for use in the present process, different techniques may be used and will be considered separately hereinafter.

In a first method for preparation of the finely divided spinel, which method can be termed a hydroxide precipitation technique, there are dissolved in an aqueous medium salts of magnesium and aluminum in such relative proportions that the gram-atom ratio of total magnesium in solution to total aluminum in solution is 1:2. As a specific example, 1.5 molar solutions of magnesium chloride and aluminum chloride are prepared by dissolving reagent grade salts in 80°C distilled water. This hot mixed chloride solution is then slowly added to an ammonium hydroxide solution having a pH which is maintained between 9.5 and 10. The resulting magnesium and aluminum precipitate, which is a gelatinous appearing hydroxide, is maintained at approximately 80°C for one half hour, thereafter cooled to room temperature, separated from the residual solution, thoroughly water-washed, and dried slowly at a temperature of 100°C. The resulting dry cake is crushed sufficiently to pass a 100 mesh screen.

In a second method for preparing the material, which can be termed an oxalate-hydroxide precipitation technique, a mixed solution of magnesium chloride and aluminum chloride is prepared in accordance with the previous example. This solution is poured rapidly into a 1.5 molar solution of oxalic acid, maintained at a temperature of 80°C. When the pH of the solution is adjusted to about 9.5 by the addition of ammonium hydroxide, the magnesium is precipitated as the oxalate and the aluminum is simultaneously precipitated as the hydroxide. The resulting oxalate-hydroxide precipitate is allowed to digest, and then rapidly cooled to room temperature, the precipitate separated, washed with a dilute aqueous ammonia solution, and then dried at 100°C. After drying, the precipitate is crushed sufficiently to pass a 100 mesh screen.

In the next processing step, the precipitate is fired under non-reactive conditions in order to convert the precipitate to a spinel powder. In the case of the hydroxide precipitate, conversion from the hydroxide to the spinel occurs at a temperature at about 400°C. Within the temperature range of from 400°C to 1400°C, the higher the firing temperature, the larger the resulting particle size of the spinel.

In the case of a mixed oxalate-hydroxide precipitate, it is necessary to fire the initial precipitate at a temperature of from about 750°C to about 1400°C in an atmosphere comprising oxygen. The preferred firing temperature is from about 800°C to 1200°C.

In the case of both precipitates, the final crystallite size is controlled by the firing temperature and time, with the higher the firing temperature and the longer the time, the larger the crystallite size. The resulting particles in either case are highly irregular in shape and this has been found to promote thorough mixing and maintenance of a uniform distribution of the alumina-spinel mixture during the sintering process. In addition, because of the extremely fine particle size, the spinel particles are scattered very thoroughly throughout the alumina in order to control the grain growth of same during sintering. As a general rule, if a final firing temperature for the foregoing spinel precipitates is less than about 1200°C, the average particle size of the irregular particles will be less than about 50 nm.

In accordance with the present process, as shown in the flow diagram, the foregoing prepared spinel powder is added to very finely divided, high purity alumina powder, which as an example has an average particle size of about 0.3 micron. This spinel powder is added to the alumina in amount of from about 0.15 to 0.7% by weight of the alumina, with the added amount preferably nearer the lower end of the foregoing range. It has been found that a lesser amount of the spinel can be tolerated than magnesium oxide since the tendency to evaporate from the surface of the arc tube during sintering is minimized by the use of spinel as compared to magnesium oxide. The mixing is readily accomplished by forming an aqueous slurry of the alumina and added spinel and thoroughly milling same. The milled slurry is then dried at 110°C and the homogenized powder mixture is sieved through a No. 230 mesh. The dried powders are then filled into a conventional isostatic pressing mold having tubular-shaped mold cavity dimensions a predetermined amount larger than the final dimensions as desired for the completed arc tube, in order to compensate for shrinkage encountered during pressing and sintering thereof. The mold which is used can be formed of polyurethane with a stainless steel mandrel.

The mold and a mold-contained powder are then isostatically pressed at a pressure of at least 15,000 psi (1,060 Kg/cm$^2$) in order to produce a pressed green tube. As an example, the pressed tube has dimensions approximately 0.95 cm ID by 20 cm in length, with a wall thickness of 0.16 cm.

In the next step of preparation, the pressed green tube is presintered at a temperature of at least 800°C for at least 1 hour in order to provide the pressed tube with sufficient strength to permit its being readily handled. Preferably the tubes are presintered at a temperature of 1100°C in air for a period of 2 hours. The presintered tubes are then final sintered at a temperature of from 1700°C and 1950°C using an oxygen atmosphere, a hydrogen atmosphere, or vacuum and the sintering is continued for a sufficient time to obtain a grain size in the sintered tube of at least 10 microns, as measured by the average planar intercept method. More specifically, if an oxygen atmosphere is used, the sintering can be conducted in two stages, an initial sintering at a temperature of 1800°C for 4 hours, thereafter followed by a second stage of sintering at a temperature of 1900°C for 5 hours. Under these conditions, the spinel additive functions very well to inhibit any excessive grain growth of aluminum oxide and the theoretical density is readily achieved in such an oxygen atmosphere. It should be understood that a vacuum or a hydrogen sintering atmosphere can be substituted for the oxygen, which will cause the sintering process to be speeded up somewhat.

Arc tubes produced by the foregoing process require no additional grinding or polishing operations and the use of the finely divided spinel of irregular shape functions very effectively to inhibit any excessive grain growth in the alumina and to control the grain size in the sintered material. Since the added spinel undergoes no chemical conversion during the sintering process, its uniform distribution within the alumina is maintained and any tendency to evaporate this grain-growth inhibitor from the surface of the arc tube during sintering is minimized.

We claim as our invention:

1. The method of preparing a tubular polycrystalline alumina member suitable for use as an arc-containing tube for an arc-discharge device, which method comprises:

a. adding to very finely divided high purity alumina powder from about 0.15 to 0.7% by weight of said alumina of magnesium aluminate spinel consisting of irregular shaped particles of average diameter less than about 100 nm, and thoroughly mixing said spinel and said alumina to achieve a uniform distribution of said spinel throughout said alumina;

b. filling said mixture as a dried powder into an isostatic pressing mold having tubular-shaped mold cavity dimensions a predetermined amount larger than the desired final dimensions for said completed arc tube to compensate for shrinkage encountered during pressing and sintering thereof;

c. isostatically pressing the mold-contained powder at a pressure of at least 15,000 psi to produce a green tube;

d. presintering the pressed green tube at a temperature of at least 800°C for at least 1 hour to provide the pressed green tube with additional strength to facilitate handling; and e. final sintering the tube at a temperature of from 1700°C to 1950°C in oxygen, hydrogen or vacuum for a sufficient period of time to obtain a grain size in said sintered tube of at least 10 microns as measured by the average planar intercept method.

2. The method as specified in claim 1, wherein said magnesium aluminate spinel consists of irregular shaped particles of average diameter less than about 50 nm.

3. The method as specified in claim 2, wherein said pressed green tube is presintered in air at a temperature of about 1100°C maintained for about 2 hours, and final sintering is conducted in an oxygen atmosphere.

* * * * *